(12) United States Patent
Suito et al.

(10) Patent No.: US 8,467,580 B2
(45) Date of Patent: Jun. 18, 2013

(54) IMAGE DATA PROCESSING APPARATUS, METHOD, PROGRAM AND RECORDING MEDIUM

(75) Inventors: Taro Suito, Kanagawa (JP); Yasuhiro Muramatsu, Tokyo (JP); Takuma Morita, Kanagawa (JP); Masanori Muroya, Tokyo (JP); Takeshi Yamauchi, Chiba (JP); Kei Hisano, Tokyo (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 11/900,083

(22) Filed: Sep. 10, 2007

(65) Prior Publication Data
US 2008/0166021 A1 Jul. 10, 2008

(30) Foreign Application Priority Data

Sep. 11, 2006 (JP) ................................. 2006-245949
Oct. 2, 2006 (JP) ................................. 2006-270960

(51) Int. Cl.
*G06K 9/00* (2006.01)
(52) U.S. Cl.
USPC ............ 382/107; 386/241; 386/242; 386/226
(58) Field of Classification Search
USPC ... 370/352, 365; 382/107, 236, 103; 711/156, 711/154, 165, 162, 159; 386/52, 68, 111, 386/120, 230, 95, 107, 241, 353, 328, 248, 386/46; 375/240.26, 240.01; 348/231.99, 348/333.01, 14.01, 333.05, 220.1, 231.3
See application file for complete search history.

(56) References Cited

U.S. PATENT DOCUMENTS

| | | | | |
|---|---|---|---|---|
| 5,289,190 A | * | 2/1994 | Shimoda et al. | 341/50 |
| 5,603,058 A | * | 2/1997 | Belknap et al. | 710/35 |
| 5,829,044 A | * | 10/1998 | Sono | 711/156 |
| 5,987,179 A | * | 11/1999 | Riek et al. | 382/236 |
| 6,185,360 B1 | * | 2/2001 | Inoue et al. | 386/248 |
| 6,226,449 B1 | * | 5/2001 | Inoue et al. | 386/225 |
| 6,603,866 B1 | * | 8/2003 | Motono et al. | 382/107 |
| 6,640,145 B2 | * | 10/2003 | Hoffberg et al. | 700/83 |
| 6,741,656 B1 | * | 5/2004 | Tanaka | 375/240.26 |
| 6,763,182 B1 | * | 7/2004 | Endo et al. | 386/224 |
| 6,771,574 B2 | * | 8/2004 | Fujimoto et al. | 369/47.1 |
| 6,910,125 B2 | * | 6/2005 | Wise et al. | 712/300 |
| 7,043,144 B2 | * | 5/2006 | Miyashita | 386/211 |

(Continued)

FOREIGN PATENT DOCUMENTS

JP 08140090 A * 5/1996
JP 11-177802 A 7/1999

(Continued)

*Primary Examiner* — Asad M Nawaz
*Assistant Examiner* — Parth Patel
(74) *Attorney, Agent, or Firm* — Wolf, Greenfield & Sacks, P.C.

(57) ABSTRACT

An image data processing apparatus includes recording means for recording contents data containing moving image data, which is encoded by a first scheme, moving image decoding means for loading the contents data recorded in the recording means and decoding the moving image data, still image encoding means for obtaining image data, which corresponds to the image to be displayed at a predetermined time, as data of a still image of image data, which is the moving image data decoded by the moving image decoding means and encoding the image data by a second scheme, and time information creating means for creating information on the time when the still image is shot based on information added to the encoded moving image data.

9 Claims, 15 Drawing Sheets

U.S. PATENT DOCUMENTS

| | | | | |
|---|---|---|---|---|
| 7,054,540 B2* | 5/2006 | Nomura et al. | | 386/283 |
| 7,079,518 B2* | 7/2006 | Park et al. | | 370/338 |
| 7,092,023 B2* | 8/2006 | Hayashi | | 348/333.05 |
| 7,095,783 B1* | 8/2006 | Sotheran et al. | | 375/240.01 |
| 7,106,954 B2* | 9/2006 | Inoue et al. | | 386/230 |
| 7,129,969 B2* | 10/2006 | Fukuda | | 348/14.01 |
| 7,379,568 B2 | 5/2008 | Movellan et al. | | |
| 7,408,581 B2* | 8/2008 | Gohda | | 348/333.05 |
| 7,450,823 B2* | 11/2008 | Naitoh | | 386/241 |
| 7,457,529 B2* | 11/2008 | Takahashi et al. | | 386/328 |
| 7,548,586 B1* | 6/2009 | Mimar | | 375/240.26 |
| 7,598,988 B2* | 10/2009 | Hagiwara et al. | | 348/231.3 |
| 7,609,295 B2* | 10/2009 | Aridome et al. | | 348/220.1 |
| 7,916,184 B2* | 3/2011 | Utagawa et al. | | 348/231.6 |
| 2001/0047443 A1* | 11/2001 | Ito et al. | | 710/107 |
| 2002/0140826 A1* | 10/2002 | Sato et al. | | 348/222.1 |
| 2002/0164567 A1* | 11/2002 | Katayama | | 434/252 |
| 2002/0191951 A1* | 12/2002 | Sodeyama et al. | | 386/46 |
| 2003/0021582 A1* | 1/2003 | Sawada | | 386/46 |
| 2003/0194209 A1* | 10/2003 | Kim et al. | | 386/68 |
| 2004/0008258 A1 | 1/2004 | Aas et al. | | |
| 2004/0028377 A1* | 2/2004 | Inakura | | 386/68 |
| 2004/0051900 A1* | 3/2004 | Sagiya et al. | | 358/1.15 |
| 2004/0196298 A1 | 10/2004 | Nagahashi et al. | | |
| 2004/0208481 A1* | 10/2004 | Hosokawa | | 386/95 |
| 2004/0233996 A1* | 11/2004 | Jung et al. | | 375/240.26 |
| 2005/0034158 A1* | 2/2005 | DeLaVega | | 725/75 |
| 2005/0069213 A1* | 3/2005 | Aoki | | 382/251 |
| 2005/0069297 A1* | 3/2005 | Kobayashi et al. | | 386/120 |
| 2005/0213810 A1 | 9/2005 | Sabe et al. | | |
| 2005/0219382 A1* | 10/2005 | Abe et al. | | 348/231.99 |
| 2005/0220336 A1 | 10/2005 | Sabe et al. | | |
| 2005/0232351 A1* | 10/2005 | Jung | | 375/240.03 |
| 2005/0264703 A1* | 12/2005 | Aoki | | 348/701 |
| 2006/0077263 A1* | 4/2006 | Hosoda | | 348/222.1 |
| 2006/0083489 A1* | 4/2006 | Aridome et al. | | 386/124 |
| 2006/0152602 A1* | 7/2006 | Koba et al. | | 348/231.99 |
| 2006/0221222 A1* | 10/2006 | Hirasawa | | 348/333.01 |
| 2006/0245751 A1* | 11/2006 | Nagaoka et al. | | 396/439 |
| 2007/0003234 A1* | 1/2007 | Inoue et al. | | 386/95 |
| 2007/0031112 A1* | 2/2007 | Ricci | | 386/95 |
| 2007/0058947 A1* | 3/2007 | Yoshida | | 386/107 |
| 2007/0269119 A1* | 11/2007 | Hyerle et al. | | 382/236 |
| 2008/0013130 A1* | 1/2008 | Sasaki | | 358/440 |
| 2008/0075338 A1 | 3/2008 | Muramatsu et al. | | |
| 2008/0174681 A1* | 7/2008 | Okada et al. | | 348/231.99 |
| 2009/0190652 A1* | 7/2009 | Kim | | 375/240.01 |
| 2010/0232703 A1* | 9/2010 | Aiso | | 382/190 |
| 2010/0284566 A1* | 11/2010 | Hisatomi et al. | | 382/103 |
| 2011/0019979 A1* | 1/2011 | Abe et al. | | 386/353 |

FOREIGN PATENT DOCUMENTS

| | | |
|---|---|---|
| JP | 2000-295568 A | 10/2000 |
| JP | 2001-197289 A | 7/2001 |
| JP | 2001-211315 A | 8/2001 |
| JP | 2002-016792 A | 1/2002 |
| JP | 2002-354428 | 12/2002 |
| JP | 2003-187257 A | 7/2003 |
| JP | 2003-242486 A | 8/2003 |
| JP | 2004-062868 A | 2/2004 |
| JP | 2004-178163 A | 6/2004 |
| JP | 2004-274428 A | 9/2004 |
| JP | 2004-312663 A | 11/2004 |
| JP | 2004-363656 | 12/2004 |
| JP | 2005-044330 A | 2/2005 |
| JP | 2005-107885 A | 4/2005 |
| JP | 2005-173471 A | 6/2005 |
| JP | 2005-175684 A | 6/2005 |
| JP | 2005-176230 A | 6/2005 |
| JP | 3690391 | 6/2005 |
| JP | 2005-267454 A | 9/2005 |
| JP | 2005-269563 A | 9/2005 |
| JP | 3719247 | 9/2005 |
| JP | 2005-284348 A | 10/2005 |
| JP | 2005-284487 A | 10/2005 |
| JP | 2005-311888 A | 11/2005 |
| JP | 2005-332244 A | 12/2005 |
| JP | 2005-341412 | 12/2005 |
| JP | 2006-072506 A | 3/2006 |
| JP | 2006-109119 A | 4/2006 |
| JP | 2006-237919 A | 9/2006 |

* cited by examiner

FIG. 3

| CHAPTER NUMBERS | SHOT TIMES | COUNTER VALUES |
|---|---|---|
| 0 | 10:00 | 0:00 |
| 1 | 10:10 | 0:05 |
| 2 | 11:03 | 0:15 |
| 3 | 11:05 | 0:17 |
| ⋮ | ⋮ | ⋮ |

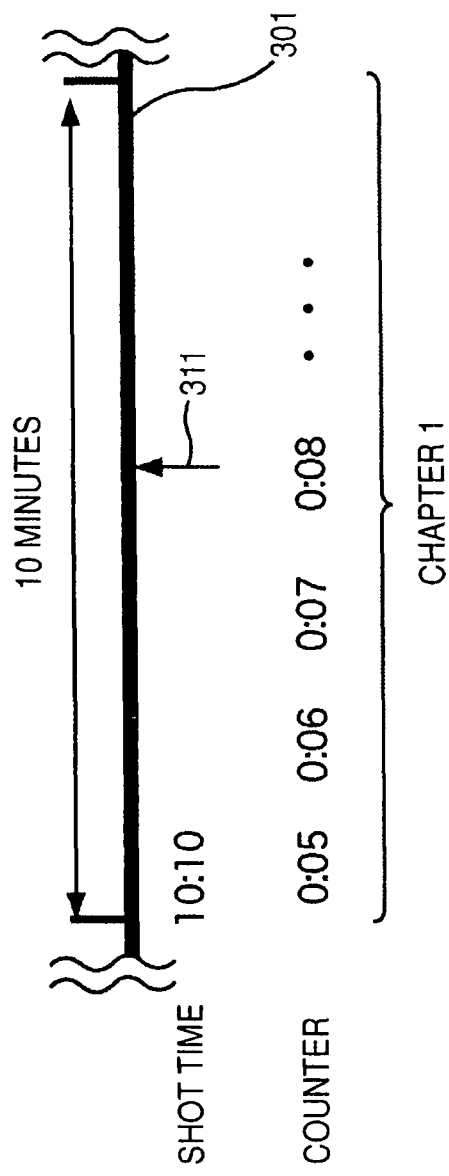

FIG. 7

| RBP | Names of Fields | Descriptions | Number of Bytes |
|---|---|---|---|
| | | Additional Recorded Information Identifier | Total 12 |
| 0 to 7 | ARI_DAT_ID | Data Identifier of Additional Recorded Information | 8 |
| 8 to 9 | ARI_DAT_VER | Version of Additional Recorded Information | 2 |
| 10 to 11 | reserved | reserved | 2 |
| | | Application Information | Total 52 |
| 12 to 16 | VND_NAME | Name of Vender | 5 |
| 17 to 28 | PRD_NAME | Name of Product | 12 |
| 29 | APL_ID | Application ID | 1 |
| 30 to 61 | MNFI_DATA | Manufacturer's Information Data | 32 |
| 62 to 63 | reserved | reserved | 2 |
| | | Recorded Time Information | Total 8 |
| 64 to 65 | VOBU_LCL_TM_ZONE | Time Zone for Recording ARI_DATA | 2 |
| 66 to 70 | VOBU_REC_TM | ARI_DATA Recorded Time | 5 |
| 71 | reserved | reserved | 1 |
| | | Camera Information | Total 1872 |
| 72 to 73 | F_NUM | F-Number | 2 |
| ... | | | |

FIG. 12

| | bit7 | bit6 | bit5 | bit4 | bit3 | bit2 | bit1 | bit0 | |
|---|---|---|---|---|---|---|---|---|---|
| 1 | 0 | keyword=44h ||||||| |
| 2 | length=39h |||||||| |
| 3 | ........................................LSB ▶ |||||||| |
| 4 | ········ETN········ |||||||| |
| 5 | ◀ MSB ........................................ |||||||| |
| 6 | NUMBER OF VIDEO FRAMES |||||||| |
| 7 | 0 | 0 | 0 | 0 | DATA-H |||| |
| 8 | ........................................LSB ▶ |||||||| |
| 9 | ◀ MSB ——VBV DELAY—— |||||||| |
| 10 | HEADER SIZE |||||||| |
| 11 | ........................................LSB ▶ |||||||| |
| 12 | |||||||| |
| 13 | ········DTS········ |||||||| |
| 14 | |||||||| |
| 15 | ◀ MSB ........................................ |||||||| |
| 16 | PF | TF | RF | 0 | 0 | SFR ||| |
| 17 | SEARCH DATA MODE |||||||| |
| 18 | ········HORIZONTAL SIZE········LSB ▶ |||||||| |
| 19 | 0 | 0 | 0 | 0 | ◀ MSB ||||
| 20 | ········VERTICAL SIZE········LSB ▶ |||||||| |
| 21 | 0 | 0 | 0 | 0 | ◀ MSB ||||
| 22 | ASPECT RATIO |||| FRAME RATE |||| |
| 23 | ........................................LSB ▶ |||||||| |
| 24 | ········BIT RATE········ |||||||| |
| 25 | ◀ MSB ........................................ |||||||| |
| 26 | ——VBV BUFFER SIZE——LSB ▶ |||||||| |
| 27 | ◀ MSB ........................................ |||||||| |
| 28 | 0 | MPEG PROFILE ||| MPEG LEVEL |||| |
| 29 | colspan=4 VIDEO FORMAT |||| colspan=2 CHROMA || 0 | 0 |
| 30 | GOP N |||| GOP M |||| |
| 31 | 0 | 0 | 0 | 0 | 0 | PE2 | PE1 | PE0 | |
| 32 | BF | 1 | TENS of FRAMES || UNIT of FRAMES |||| |
| 33 | 1 | TENS of SECONDS ||| UNIT of SECONDS |||| |
| 34 | 1 | TENS of MINUTES ||| UNIT of MINUTES |||| |
| 35 | 1 | 1 | TENS of HOURS || UNIT of HOURS |||| |
| 36 | DS | TM | TENS of TIME ZONE || UNIT of TIME ZONE |||| |
| 37 | 1 | 1 | TENS of DAY || UNIT of DAY |||| |
| 38 | WEEK ||| TNMN | UNIT of MONTH |||| |
| 39 | TENS of YEAR |||| UNIT of YEAR |||| |

Rows 1–16: Pack-V information
Rows 17–31: Video mode
Row 32: 401
Row 33: 402 — TTC
Row 34: 403
Row 35: 404
Row 36: 421
Row 37: 422 — REC DATE
Row 38: 423
Row 39: 424

| | MSB | | | | | | | LSB | |
|---|---|---|---|---|---|---|---|---|---|
| PC0 | 0 | 1 | 1 | 0 | 0 | 0 | 1 | 1 | |
| PC1 | 1 | 1 | TENS of FRAMES | | UNITS of FRAMES | | | | 521 |
| PC2 | 1 | TENS of SECONDS | | | UNITS of SECONDS | | | | 522 REC TIME |
| PC3 | 1 | TENS of MINUTES | | | UNITS of MINUTES | | | | 523 |
| PC4 | 1 | 1 | TENS of HOURS | | UNITS of HOURS | | | | 524 |

IMAGE DATA PROCESSING APPARATUS, METHOD, PROGRAM AND RECORDING MEDIUM

CROSS REFERENCES TO RELATED APPLICATIONS

The present invention contains subject matter related to Japanese Patent Applications JP 2006-245949 and JP 2006-270960 filed in the Japanese Patent Office on Sep. 11, 2006 and Oct. 2, 2006, respectively, the entire contents of which being incorporated herein by reference.

BACKGROUND OF THE INVENTION

1. Field of the Invention

The present invention relates to an image data processing apparatus, method, program and recording medium and, in particular, to an image data processing apparatus, method, program and recording medium, which allow identifying the time when a still image, which is extracted from moving images, is shot.

2. Description of the Related Art

In recent years, a still image may be extracted from moving image data in machines such as a DVD (Digital Versatile Disc) recorder and an HDD (Hard Disk Drive) recorder.

An electronic camera has been also proposed which can shoot a still image while moving images are being shot (refer to JP-A-2000-295568 (Patent Document 1), for example).

SUMMARY OF THE INVENTION

However, it is difficult to identify the shot date and time of a still image extracted from moving images. In other words, it is difficult to identify when apart of a video picture recorded in a predetermined period of time is shot.

On the other hand, in viewing a still image by using application software that displays multiple still images in series, such as a slide show, displaying the date and time when the image is shot improves the convenience to a user who is viewing the still image.

Accordingly, it is desirable to identify the time when a still image extracted from moving images is shot.

According to an embodiment of the present invention, there is provided an image data processing apparatus including recording means for recording contents data containing moving image data, which is encoded by a first scheme, moving image decoding means for loading the contents data recorded in the recording means and decoding the moving image data, still image encoding means for obtaining image data, which corresponds to the image to be displayed at a predetermined time, as data of a still image of image data, which is the moving image data decoded by the moving image decoding means and encoding the image data by a second scheme, and time information creating means for creating information on the time when the still image is shot based on information added to the encoded moving image data.

The time information creating means may create the information on the time when the still image is shot based on the shot times of the moving images corresponding to chapters in the encoded moving image data and counter information created by dividing the play time of the moving image data by a predefined unit time.

The image data processing apparatus may further include moving image encoding means for encoding moving image data by the first scheme. In this case, the moving image data contained in the contents data to be recorded in the recording means can be supplied as data in a DV (Digital Video) format and be encoded by the first scheme by the moving image encoding means before recorded.

The time information creating means may create information on the time when the still image is shot based on the shot times of images in a predetermined frame of the moving images, which is multiplexed and added along with the moving image data, in the encoded moving image data, and the number of frames by which the moving image data may be decoded and reproduced by the moving image decoding means.

The moving image data contained in the contents data to be recorded in the recording means may be moving image data, which is encoded by the first scheme before supplied.

According to another embodiment of the invention, there is provided an image data processing method including the steps of loading contents data containing moving image data encoded by a first scheme, which is recorded in recording means, and decoding the moving image data, obtaining image data, which corresponds to the image to be displayed at a predetermined time, as data of a still image of image data, which is the decoded moving image data, creating information on the time when the still image is shot based on information added to the encoded moving image data, and encoding the obtained still image data by a second scheme along with the created time information.

According to another embodiment of the invention, there is provided a computer-readable program including the steps of controlling loading contents data containing moving image data encoded by a first scheme, which is recorded in recording means, and decoding the moving image data, controlling obtaining image data, which corresponds to the image to be displayed at a predetermined time, as data of a still image of image data, which is the decoded moving image data, controlling creating information on the time when the still image is shot based on information added to the encoded moving image data, and controlling encoding the obtained still image data by a second scheme along with the created time information.

According to another embodiment of the invention, contents data containing moving image data encoded by a first scheme, which is recorded in recording means, is loaded, and the moving image data is decoded. Then, image data, which corresponds to the image to be displayed at a predetermined time, is obtained as data of a still image of image data, which is the decoded moving image data, and information on the time when the still image is shot is created based on information added to the encoded moving image data. The obtained still image data is encoded by a second scheme along with the created time information.

According to the embodiments of the invention, the time when a still image extracted from moving images is shot can be identified.

BRIEF DESCRIPTION OF THE DRAWINGS

FIG. 3 is a diagram showing an example of information having correspondences between starting positions of chapters and counter values thereof;

FIG. 6 is a diagram illustrating the identification of the shot time of a still image;

FIG. 7 is a diagram showing an example of added information;

FIG. 12 is a diagram showing a detail construction of the AUX-V Video frame in FIG. 11;

DESCRIPTION OF THE PREFERRED EMBODIMENTS

Before describing embodiments of the invention below, correspondences between constituent features of the invention and embodiments described and illustrated in the specification and drawings will be described as follows. This description is for ensuring that embodiments supporting the invention are described and illustrated in the specification or drawings. Therefore, embodiments described or illustrated in the specification or a drawing but not described herein as an embodiment corresponding to constituent features of the invention, if any, do not mean that they do not correspond to the constituent features. Conversely, embodiments described herein as those corresponding to the constituent features do not mean that the embodiments do not correspond to constituent features excluding the constituent features.

An image data processing apparatus according to an embodiment of the invention includes recording means (such as an HDD 152 in FIG. 1) recording contents data containing moving image data, which is encoded by a first scheme, moving image decoding means (such as an MPEG decoder 171 in FIG. 1) loading the contents data recorded in the recording means and decoding the moving image data, still image encoding means (such as a JPEG encoder 192 in FIG. 1) obtaining image data, which corresponds to the image to be displayed at a predetermined time, as data of a still image of image data, which is the moving image data decoded by the moving image decoding means and encoding the image data by a second scheme, and time information creating means (such as a microcomputer 101 in FIG. 1) creating information on the time when the still image is shot based on information added to the encoded moving image data.

The image data processing apparatus may further include moving image encoding means (such as an MPEG encoder 123 in FIG. 1) encoding moving image data by the first scheme. The moving image data contained in the contents data to be recorded in the recording means may be supplied as data in a DV (Digital Video) format and be encoded by the first scheme by the moving image encoding means before recorded.

Figure 4:
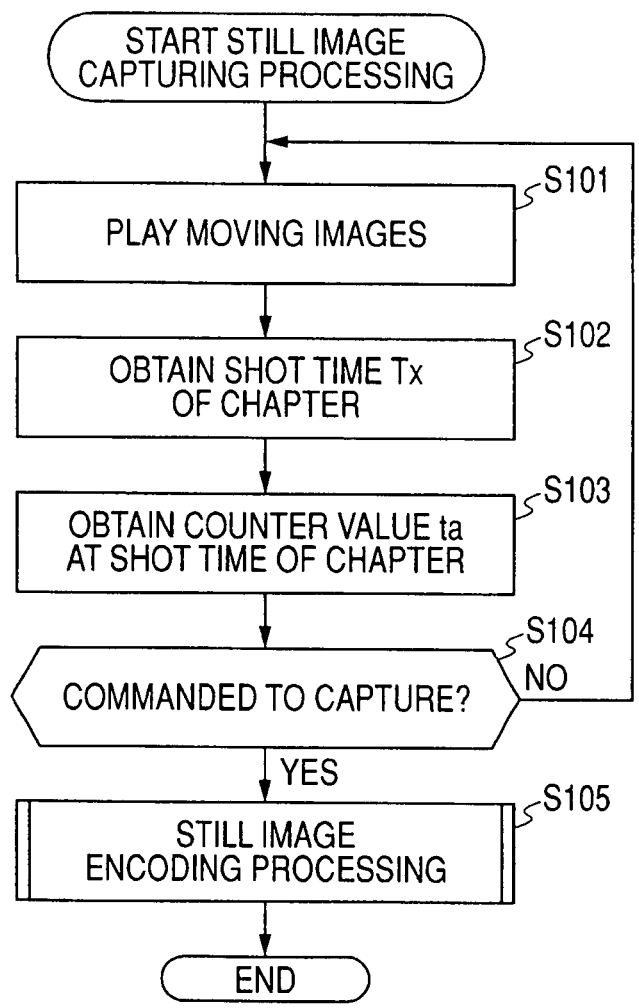
FIG. 4 is a flowchart illustrating an example of still-image capturing processing.
Figure 5:
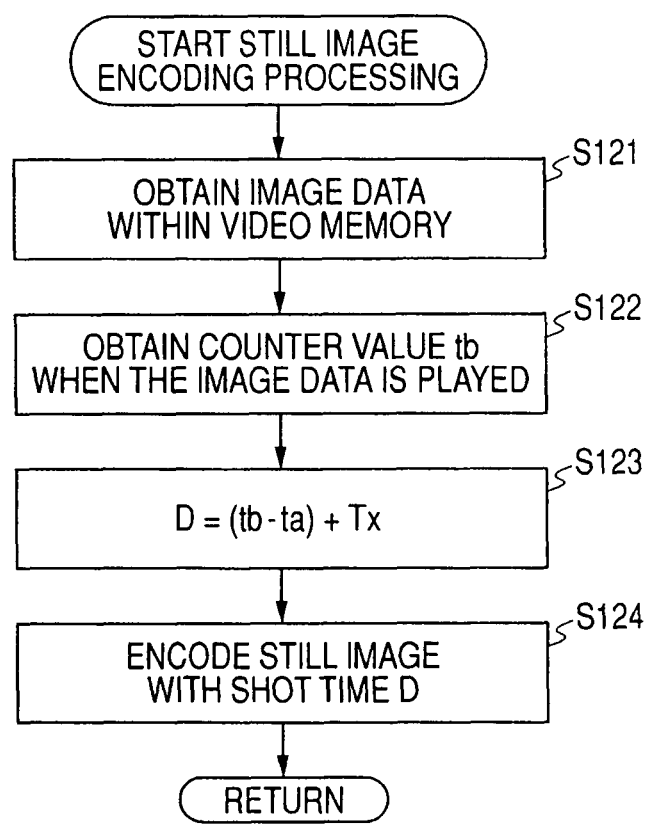
FIG. 5 is a flowchart illustrating an example of still-image encoding processing.
Figure 9:
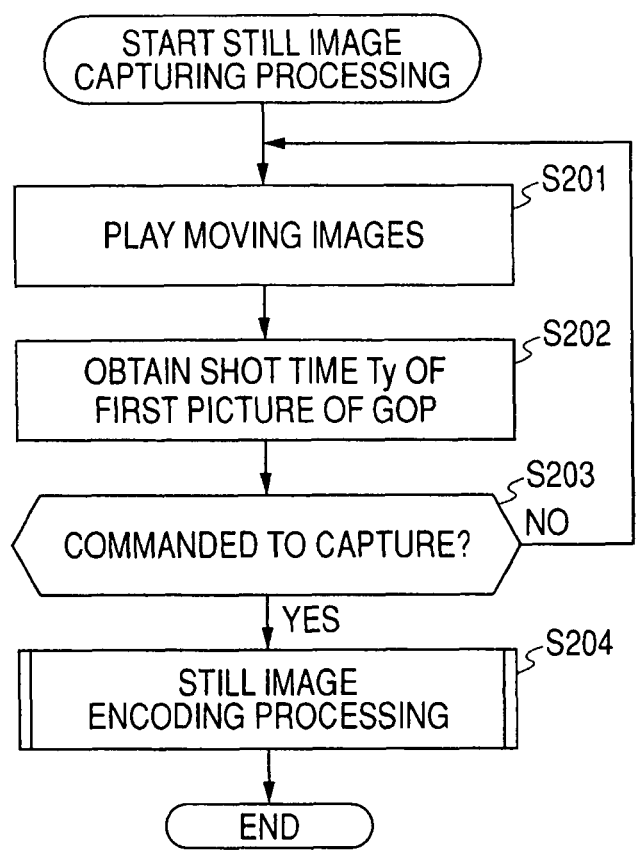
FIG. 9 is a flowchart illustrating another example of the still-image capturing processing.
Figure 10:
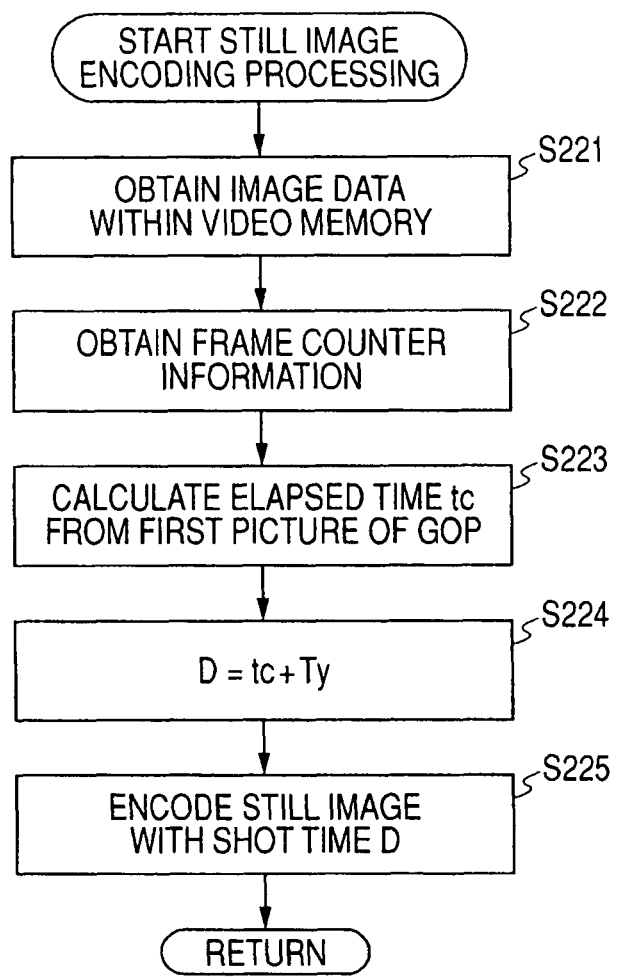
FIG. 10 is a flowchart illustrating another example of the still-image encoding processing.

An image data processing method according to another embodiment of the invention includes the steps of loading contents data containing moving image data encoded by a first scheme, which is recorded in recording means, and decoding the moving image data (such as the processing in step S101 in FIG. 4 or step S201 in FIG. 9), obtaining image data, which corresponds to the image to be displayed at a predetermined time, as data of a still image of image data, which is the decoded moving image data (such as the processing in step S121 in FIG. 5 or in step S221 in FIG. 10), creating information on the time when the still image is shot based on information added to the encoded moving image data (such as the processing in step S123 in FIG. 5 or step S224 in FIG. 10), and encoding the obtained still image data by a second scheme along with the created time information (such as the processing in step S124 in FIG. 5 or step S225 in FIG. 10).

With reference to drawings, embodiments of the invention will be described below.

Figure 1:
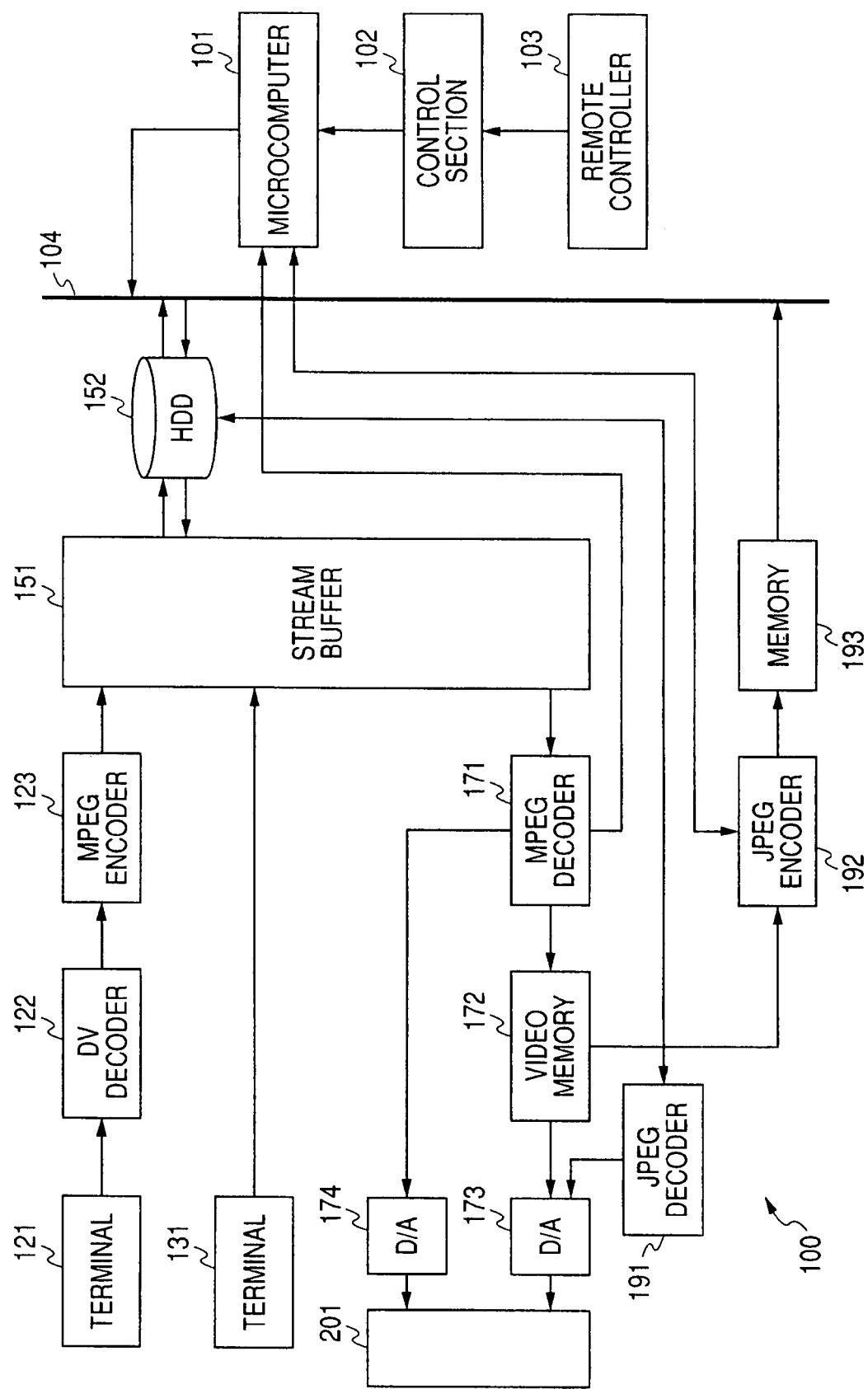
FIG. 1 a block diagram showing a construction example according to an embodiment of a recorder/player to which the invention is applied.

FIG. 1 is a block diagram showing a construction example according to an embodiment of a recorder/player 100 to which the invention is applied.

The recorder/player 100 in FIG. 1 records data such as contents supplied from an electronic machine connected to the recorder/player 100 in an HDD (Hard Disk Drive) 152, which is a recording medium, loads the recorded contents data from the HDD 152 and outputs image and voice signals of the contents to a monitor 201, which may be provided as a television receiver, for example.

A microcomputer 101 of the recorder/player 100 controls blocks included in the recorder/player 100. For example, an operation by a user, which may be performed through a remote controller 103, for example, is received by a control section 102, and a signal corresponding to a command from a user is supplied from the control section 102 to the microcomputer 101. Various control signals output from the microcomputer 101 are supplied to blocks in the recorder/player 100 through a bus 104, and signals output from blocks in the recorder/player 100 are supplied to the microcomputer 101 through the bus 104.

A terminal 121 is a terminal to which an electronic machine (such as a camcorder) that supplies contents data containing image or voice data is connected and is a terminal to which a camcorder, for example, that outputs contents data in DV format is connected.

Contents data supplied from the terminal 121 is decoded by a DV decoder 122 and is output to an MPEG encoder 123 as baseband data.

The MPEG encoder 123 encodes the baseband data supplied from the DV decoder 122 by an MPEG scheme and outputs it to a stream buffer 151.

The stream buffer 151 holds a predetermined recording unit amount of the encoded contents data supplied from the MPEG encoder 123 or data supplied from a terminal 131, which will be described later and outputs it to an HDD 152. The encoded contents data is recorded in the HDD 152. In recording contents data in the HDD 152, the microcomputer 101 creates management information for controlling the playback of the contents as required, which is recorded in the HDD 152 with a correspondence between the management information and the contents data.

The terminal 131 is a terminal to which a camcorder, for example, that outputs contents data in a different format from DV format is connected. For example, a camcorder that outputs contents data compressed and encoded by MPEG or equivalent scheme may be connected to the terminal 131. Therefore, the contents data supplied from the terminal 131 is supplied to the stream buffer 151 without decoding and encoding by MPEG scheme again.

In order to play recorded contents under the control of the microcomputer 101, contents data is output from the HDD 152 to the stream buffer 151, and the stream buffer holds a predetermined playback unit amount of contents data (encoded data) supplied from the HDD 152 and outputs it to an MPEG decoder 171 as required.

The MPEG decoder 171 decodes the encoded data supplied from the stream buffer 151 and outputs the decoded baseband image data to a video memory 172. The voice data decoded by the MPEG decoder 171 is output to a D/A converter 174.

The video memory 172 holds the baseband image data corresponding to a predetermined number of screens, for example, and supplies it to a D/A converter 173.

The D/A converter 173 converts image data supplied from a video memory to image signals, which can be processed by the monitor 201, and outputs them to the monitor 201. The D/A converter 174 converts voice data supplied from the MPEG decoder 171 to voice signals, which can be processed by the monitor 201, and outputs them to the monitor 201.

Based on a control signal from the microcomputer 101, a JPEG encoder 192 obtains image data held in the video memory 172 and encodes the image data by JPEG scheme.

For example, when a user viewing images displayed as moving images on the monitor 201 commands to capture an image by operating the remote controller 103, for example, the microcomputer 101 controls the JPEG encoder 192 to obtain the image data corresponding to the image displayed on the monitor 201 currently from the video memory 172.

The image (still image) data encoded by the JPEG encoder 192 is output to a memory 193 and is supplied and recorded from the memory 193 to the HDD 152 through the bus 104.

In order to play image data encoded by JPEG scheme under the control of the microcomputer 101, the image data encoded by JPEG scheme is loaded from the HDD 152 and is supplied to a JPEG decoder 191.

The JPEG decoder 191 decodes the image data encoded by JPEG scheme, which is supplied from the HDD 152, and outputs the decoded data to the D/A converter 173. Then, the D/A converter 173 converts the image data supplied from the JPEG decoder 191 to image signals, which can be processed by the monitor 201, and outputs the image signals to the monitor 201.

Thus, the recorder/player 100 can record the contents data supplied through the terminal 121 or terminal 131 and play the recorded contents data. Furthermore, the recorder/player 100 can capture a moving image of contents being played at a time desired by a user and record it as a still image data and can play the recorded still image data.

In addition, information such as the date and time when a still image is shot can be added to the still image data to be recorded by the recorder/player 100. The addition of the information such as the date and time when a still image is shot by the recorder/player 100 will be described.

First of all, an example of the addition of the information such as the date and time when a still image is shot will be described in a case that the still image is extracted and recorded from contents data supplied through the terminal 121.

In extracting and recording a still image from contents data supplied through the terminal 121 in the recorder/player 100, the date and/or time when the image is shot is/are identified based on the starting time of a chapter, which will be described later.

Figure 2:
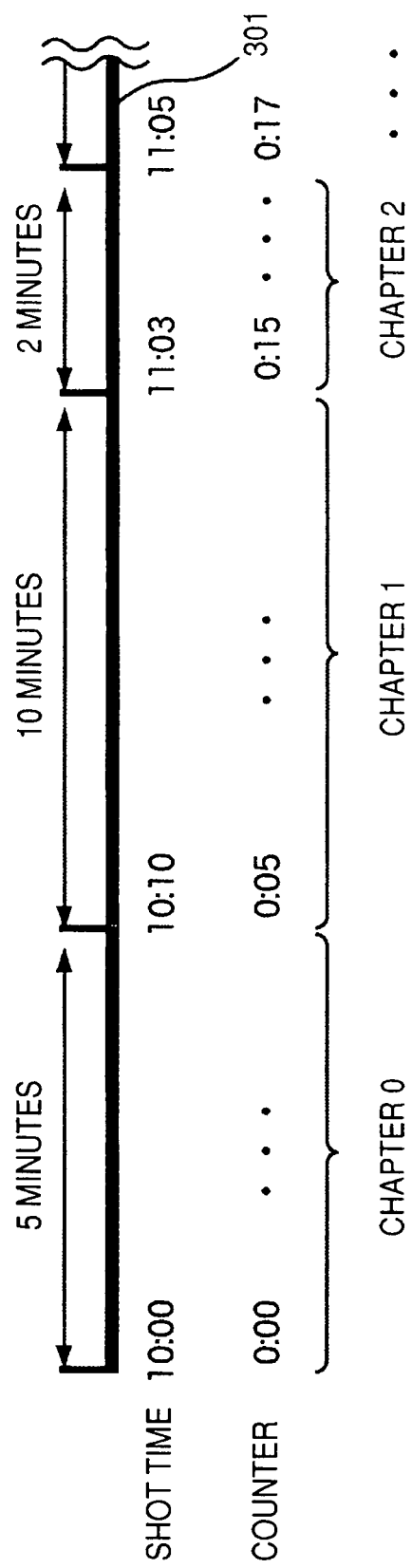
FIG. 2 is a diagram illustrating an example of chapters of contents.

FIG. 2 is a diagram illustrating an example of the chapter of contents. FIG. 2 shows an example of contents containing moving images shot by a camcorder, for example, and the line 301 indicates contents data. In FIG. 2, the time passes from the left to the right in FIG. 2 in recording or playing. In this example, the contents data indicated by the line 301 is divided into multiple chapters such as Chapter 0, Chapter 1 and Chapter 2.

The chapter is a management unit of data to be used in DVD video format or DVD VR format. In the recorder/player 100, the contents data input through the terminal 121 is recorded in the HDD 152 with correspondences between management information, which is created by the microcomputer 101 for locating chapters in the contents data, and the contents data.

In this case, a chapter includes data of contents (images or images and voice) corresponding to a period from a time when image shooting is started by a camcorder to a time when the shooting ends. In the example in FIG. 2, the shooting times are given below the line 301, and the shooting times indicate the times when shooting chapters are started.

In other words, shooting Chapter 0 is started at the time "10:00" and ends five minutes later (at the time "10:05"). Shooting Chapter 1 is started at the time "10:10" and ends ten minutes later (at the time "10:15"). Shooting Chapter 2 is started at the time "11:03" and ends two minutes later (at the time "11:05"). Shooting the chapter subsequent to Chapter 2 is started from the time "11:05".

How the shooting starting time of a chapter is identified will be described later.

Counter values are given below the shot times in FIG. 2. The counter values are information pieces given chronologically and serially from the beginning of contents data at predetermined time intervals (such as one minute). When contents are played serially in order of Chapter 0, Chapter 1, Chapter 2 and so on in this case, the time when playing Chapter 0 is started is the counter value "0:00". The times when parts (positions above the line 301) of the contents are played are displayed as the counter values. Therefore, the counter value of the starting position of Chapter 1 to be played five minutes after the time when playing Chapter 0 is started is "0:05". The counter value of the starting position of Chapter 2 to be played fifteen minutes after the time when playing Chapter 0 is started is "0:15".

In the recorder/player 100, each of these counter values may be created by the microcomputer 101 based on a signal output from the MPEG encoder 123, for example, when the contents data input through the terminal 121 is recorded in the HDD 152. Then, as a part of management information that locates a chapter in the contents data, information that establishes a correspondence between the starting position of the chapter and the counter value is created.

FIG. 3 is a diagram showing an example of the information included in the management information, which is the information that establishes a correspondence between the starting position of a chapter and the counter value. As shown in FIG. 3, chapter numbers and respective shot time and counter values of the chapters are given in a corresponding manner. As described above, the shot time herein refers to the time when shooting a chapter is started and therefore refers to a shot time of the first image of a chapter.

In extracting a still image from moving images of contents being played and recording the data, the shot time of the extracted still image can be identified based on the shot time recorded for each chapter and the counter value.

The data of the extracted still image is encoded by JPEG scheme by the JPEG encoder 192, is output to the memory 193 and is supplied and recorded from the memory 193 to the HDD 152 through the bus 104.

Having described the example in which the shot times and counter values are expressed by units of hours and minutes, the shot times and counter values may be expressed by units of years, months, dates or seconds, for example. Alternatively, the shot times or counter values may be counted and expressed by a different unit from the unit of time to be counted by a general clock. In other words, the information that can identify the shot time of a still image extracted from moving images is only necessarily included when the still image is processed, for example, when the still image is displayed.

With reference to the flowcharts in FIGS. 4 and 5, the still image capturing processing by the recorder/player 100 will be described. The processing is performed when the processing of playing contents supplied from the terminal 121 and recorded in the HDD 152 is performed in accordance with a command by a user.

In step S101, the microcomputer 101 plays moving images of contents recorded in the HDD 152. Here, as described above, the data of the contents is output from the HDD 152 to the stream buffer 151 and is output from the stream buffer 151 to the MPEG decoder 171. Then, the MPEG decoder 171 decodes the data supplied and encoded from the stream buffer 151 and outputs the decoded baseband image data to the video memory 172.

In step S102, the microcomputer 101 obtains a shot time Tx of a chapter being currently played.

In step S103, the microcomputer 101 obtains a counter value ta corresponding to the shot time of the chapter being currently played. The counter value ta is obtained based on the information described with reference to FIG. 3, for example.

In step S104, the microcomputer 101 determines whether capturing a still image is commanded or not. If not, the processing returns to step S101. The subsequent processing is performed again.

When a user viewing moving images of contents played by the processing in step S101 and displayed on the monitor 201 desires to retain an image currently being displayed as a still image, a command to instruct capturing the still image is input to the recorder/player 100 by operating the remote controller 103, for example. When the command instructing capturing the still image is input, it is determined in step S104 that capturing the still image is commanded, and the processing moves to step S105.

In step S105, the microcomputer 101 performs still image encoding processing. Thus, the image played and displayed when capturing is commanded is recorded as the still image data.

With reference to the flowchart in FIG. 5, details of the still image encoding processing in step S105 in FIG. 4 will be described.

In step S121, the microcomputer 101 controls the JPEG encoder 192 to obtain image data held within the video memory 172, which is image data corresponding to the image being currently displayed on the monitor 201.

In step S122, the microcomputer 101 obtains the counter value tb at the time when the image data obtained by the processing in step S121 is played. The counter value upon playback is created by the microcomputer 101 based on a signal output by the MPEG decoder 171 for performing processing of playing the contents, for example.

In step S123, the microcomputer 101 calculates the shot time D of the (captured) still image to be recorded by the equation below.

$$D=(tb-ta)+Tx$$

where (tb−ta) refers to the time passed from the time when the first image of a chapter is shot to the time when the image corresponding to the captured still image is shot. The shot time D of the still image is calculated by adding the time to the time Tx when the first image of the chapter is shot.

With reference to FIG. 6, details thereof will be further described. In FIG. 6, contents data is indicated by the line 301 like FIG. 2. Here, when the image at the position indicated by the arrow 311 is played while the Chapter 1 is being played, capturing the still image is commanded (step S104).

The processing in steps S102 and S103 obtains the time "10:10" as the shot time (shooting starting time) Tx of Chapter 1 and obtains "0:05" as the counter value ta corresponding to the time Tx.

Then, in step S122, "0:08" is obtained as the counter value tb when the image to be commanded to capture is played. Thus, apparently, "0:03" has passed from the time when playing Chapter 1 is started (or the time when the first image of Chapter 1 is shot). Therefore, the shot time D of the image corresponding to the position indicated by the arrow 311 is identified as "10:13".

Referring back to FIG. 5, in step S124 after the processing in step 123, the microcomputer 101 causes the JPEG encoder 192 to encode the data of the captured still image by handling the shot time of the still image as the shot time D, which is calculated by the processing in step S123, and causes the HDD 152 to record the encoded data. Notably, the shot time D is encoded and recorded by JPEG scheme along with the data of the still image by embedding the shot time D as a part of shooting information in the file format of EXIF (Exchangeable Image File Format).

In this way, a still image is extracted from played moving images, and the information such as the date and/or time when the still image is shot is identified and is added to the data of the still image. Then, the still image with the information is recorded.

Having described above that the data supplied from a camcorder, for example, connecting to the terminal 121 is data in DV format, the data in another format may be supplied from a camcorder connecting to the terminal 121. In this case, a decoder compliant with the format may be provided instead of the DV decoder 122.

Next, an example of the addition of the information such as the date and time when a still image is shot will be described in a case that the still image is extracted and recorded from contents data supplied through the terminal 131.

As described above, the terminal 131 is a terminal to which a camcorder, for example, that outputs contents data in a different format from DV format is connected and to which a camcorder, for example, that outputs contents data compressed and encoded by MPEG or equivalent scheme is connected.

In the camcorder connecting to the terminal 131, information such as the shot date and time is added to image data when moving images thereof are shot, and the image data with the information can be recorded in a recording medium. The contents data output by the camcorder is contents data encoded by MPEG scheme, for example. Added information (added information ARI_DATA) as shown in FIG. 7, for example, is multiplexed with and encoded with the contents data.

In FIG. 7, the RBP (Reference Byte Position) refers to a relative byte position within a packet, for example, and the beginning of the added information is "0". FIG. 7 further includes the names of fields, descriptions and numbers of bytes of the byte positions described in the column of the RBP. The one having "reserved" in the column of the name of field or description in FIG. 7 refers to a field reserved for a future application.

The added information includes an additional record identifier, application information, recording time information and camera information. The additional record identifier may be an identifier for identifying given data as added information. The application information may include the name of a vender that has manufactured a given product.

As the recording time information, a time zone when each contents is recorded and the recording time are recorded in the fields under the field name "VOBU_LCL_TM_ZONE" and field name "VOBU_REC_TM". The recording time here refers to the shot time of contents and the shot time of a frame of a predetermined I-picture of encoded image data and includes the year, month, date, hour, minute and second.

The time zone upon recording may be an offset time from a UTC (Coordinated Universal Time) defined to a machine by a user and may be the time difference corresponding to the country time (local time) where the machine is used.

Information such as a set condition (such as the F-number) for shooting is recorded as the camera information.

A correspondence is established between the added information as shown in FIG. 7 and each GOP (Group of Pictures) in an encoded stream by MPEG scheme, for example, and the added information is supplied from the terminal 131.

Figure 8:
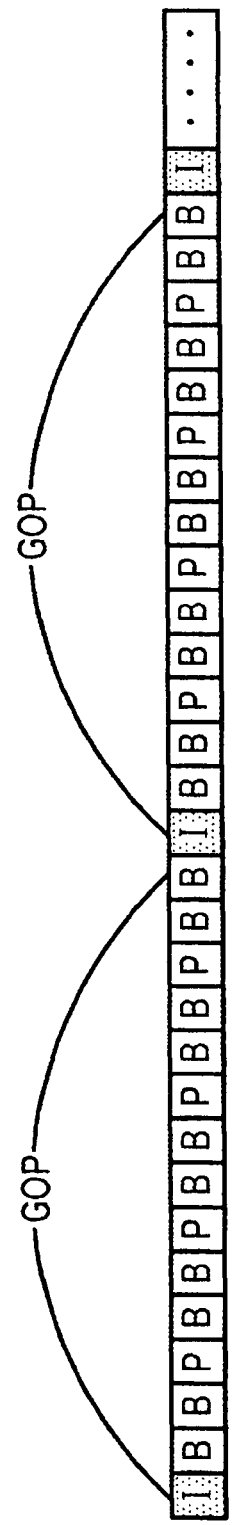
FIG. 8 is a diagram illustrating a relationship between added information and a GOP.

In this example, a GOP is constructed as a series of data pieces from one I-picture to the next I-picture in a video stream of image data encoded by MPEG scheme as shown in FIG. 8. In FIG. 8, "I", "B" and "P" refer to the data of I-, B- and P pictures. The added information as shown in FIG. 7 is added in accordance with the data of the "I (I-picture)" in FIG. 8 and is supplied from the terminal 131 to the recorder/player 100.

The added information as shown in FIG. 7 is described as "user_data" within the sequence header included in the payload of a PES (Packetized Elementary Stream) included in a data stream encoded by MPEG scheme, for example. Thus, the added information is supplied from the terminal 131 as a part of contents data.

The information such as a shot time to be added to image data by a camcorder connecting to the terminal 131 is not limited to the one having the construction as shown in FIG. 7. Another information may be added to image data based on the specifications of a machine connecting to the terminal 131. Furthermore, the one having described above is an example of the place where the added information is stored in the data supplied from the terminal 131 and is not limited to the one described as the "user_data" in a data stream encoded by MPEG scheme. In other words, information on the shot time of a predetermined picture is only necessarily embedded with no influence on encoding or decoding processing on moving images.

In the case of contents recorded through the terminal 121, a still image is extracted from the moving images of the contents being played, and the data is recorded. Here, the shot time of the extracted still image can be identified based on the shot time recorded for each chapter and the counter value. However, in the case of contents recorded through the terminal 131, the shot time of an extracted still image can be identified based on the recording time of the added information, which has been described above with reference to FIG. 7, and the number of played frames when the still image is extracted from moving images of the contents being played and the data is recorded.

In other words, the recording time in the added information refers to the time when the I-picture in a GOP is shot. Therefore, when a command is given to capture a still image while a picture which is not the I-picture is being played, the shot time of the still image may be identified by calculating the elapsed time from the shot time of the I-picture to the shot time of the image based on the number of frames during a period from the playback of the I-picture to the playback of the image.

Also in this case, the data of an extracted still image is also encoded by JPEG scheme by the JPEG encoder 192, is output to the memory 193, and is supplied to and recorded from the memory 193 to the HDD 152 through the bus 104.

Having described here the example in which the shot time is expressed in the unit of years, months, dates, hours, minutes or seconds, the shot time may be counted and expressed in a different unit from the unit of time counted by a general clock, for example. In other words, information by which the shot time of a still image extracted from moving images is identifiable is only necessarily included when processing of displaying the still image is performed, for example.

Next, with reference to the flowcharts in FIGS. 9 and 10, another example of the still image capturing processing by the recorder/player 100 will be described. This processing is performed when the processing of playing contents supplied from the terminal 131 and recorded in the HDD 152 is performed in accordance with a command by a user.

In step S201, the microcomputer 101 plays moving images of contents recorded in the HDD 152. Here, as described above, the contents data is output from the HDD 152 to the stream buffer 151 and is output from the stream buffer 151 to the MPEG decoder 171. The MPEG decoder 171 decodes encoded data supplied from the stream buffer 151, and the data of the decoded baseband image is output to the video memory 172.

In step S202, the microcomputer 101 obtains the shot time Ty of the I-picture, which is the first picture of the GOP being currently played. The shot time Ty is obtained based on, for example, the added information, which has been described above with reference to FIG. 7.

In step S203, the microcomputer 101 determines whether capturing a still image has been commanded or not. If not, processing returns to step S201, and the subsequent processing is performed again.

When a user viewing moving images of contents played by the processing in step S201 and displayed on the monitor 201 desires to retain an image currently being displayed as a still image, a command to instruct capturing the still image is input to the recorder/player 100 by operating the remote controller 103, for example. When the command instructing capturing the still image is input, it is determined in step S203 that capturing the still image has been commanded, and the processing moves to step S204.

In step S204, the microcomputer 101 performs still image encoding processing. Thus, the image played and displayed when capturing is commanded is recorded as the still image data.

With reference to the flowchart in FIG. 10, details of the still image encoding processing in step S204 in FIG. 9 will be described.

In step S221, the microcomputer 101 controls the JPEG encoder 192 to obtain image data held within the video memory 172, which is image data corresponding to the image being currently displayed on the monitor 201.

In step S222, the microcomputer 101 obtains the frame counter information at the time when the image data obtained by the processing in step S221 is played. The frame counter information is information which can be provided by identifying the number of frames displayed from the time when the first picture (I-picture) of a GOP is played up to the current moment based on a signal output by the MPEG decoder 171 for performing processing of playing the contents, for example.

In step S223, the microcomputer 101 calculates the elapsed time tc from the time when the first picture (I-picture) of a GOP is played to the time when the current image (or image to be captured) is displayed based on the information on the frame counter obtained by the processing in step S222. In other words, since the information on the frame counter specifies the number of frames, the time necessary for displaying the number of frames is calculated as the elapsed time tc.

In step S224, the microcomputer 101 calculates the shot time D of the (captured) still image to be recorded by the equation below.

$$D = tc + Ty$$

The elapsed time tc refers to the elapsed time from the time when the first image (picture) of a GOP is shot to the time when the image corresponding to the captured still image is shot. Therefore, in other words, the shot time D of the still image is calculated by adding the time to the time Ty when the first image of the chapter is shot.

Having described the example that the time necessary for displaying the number of frames is calculated as the elapsed time tc since the information on the frame counter can specify the number of frames, the elapsed time tc may be calculated by supplying information on the time stamp given to a picture to be played from the MPEG decoder 171 to the microcomputer 101.

In step S225, the microcomputer 101 causes the JPEG encoder 192 to encode the data of the captured still image by handling the shot time of the still image as the shot time D, which is calculated by the processing in step S224, and causes the HDD 152 to record the encoded data. Notably, the shot time D is encoded and recorded by JPEG scheme along with the data of the still image by embedding the shot time D as a part of shooting information in the file format of EXIF (Exchangeable Image File Format), for example.

Also in this way, a still image is extracted from played moving images, and the information such as the date and/or time when the still image is shot is identified and is added to the data of the still image. Then, the still image data with the information is recorded.

Next, another example will be described of the addition of information such as the date and time when a still image is shot, which is to be extracted and recorded from contents data supplied through the terminal 131. Here, in this example, the terminal 131 is provided in the recorder/player 100 as a terminal to which a camcorder that outputs contents data in HDV (High-Definition Video) format is connected.

The HDV is the standard of recording formats for recording an HDTV image with an equal compression efficiency in a recording medium such as a DV cassette tape. The contents data in HDV format supplied through the terminal 131 is constructed in Pack-Units as shown in FIG. 11.

Figure 11:
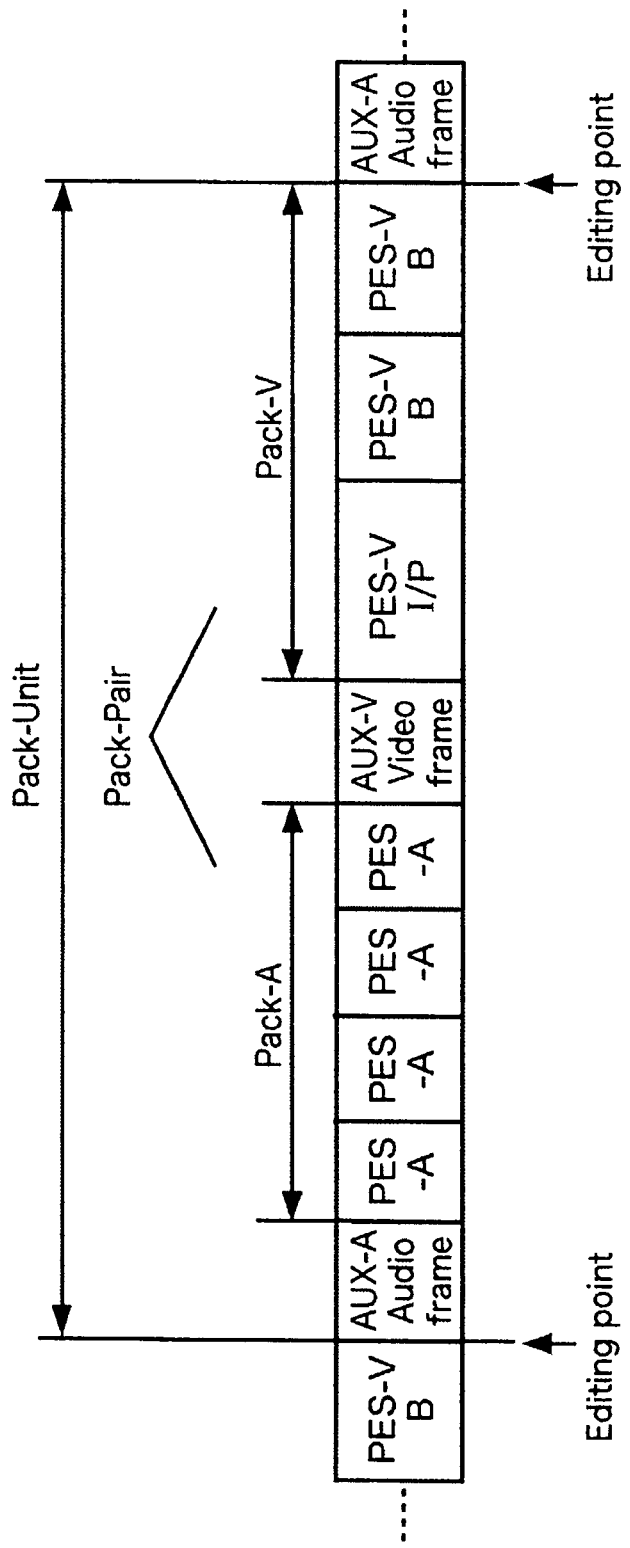
FIG. 11 is a diagram showing a construction of contents data in HDV format.

In FIG. 11, one Pack-Unit includes an AUX-A Audio frame, a Pack-A, an AUX-V Video frame and a Pack-V. A Pack-A includes four PES-As. A Pack-V includes three PES-Vs. Each of the AUX-A Audio frame, AUX-V Video frame, PES-A and PES-V is a packet included in the Pack-Unit and is provided as a PES (Packetized Elementary Stream) defined by MPEG scheme.

Note that one Pack-A and one Pack-V corresponding thereto in one same Pack-Unit are called Pack-Pair.

The PES-A and PES-V are packets to store voice data and image data corresponding to voice and images of contents. The AUX-A Audio frame and AUX-V Video frame are packets to store added information, which is to be added to the voice data and image data, for example. As shown in FIG. 11, one AUX-A Audio frame exists for four PES-As, and one AUX-V Video frame exists for three PES-Vs. The first PES-V of the three PES-Vs stores image data of an I-picture or P-picture. The subsequent two PES-Vs store image data of a B-picture.

FIG. 12 is a diagram showing a detail construction of the AUX-V Video frame in FIG. 11. FIG. 12 horizontally shows bit positions from the first bit (bit0) to the eighth bit (bit 7). FIG. 12 vertically shows byte positions from the first byte to the thirty ninth byte.

As shown in FIG. 12, one AUX-V Video frame includes 312 bytes (8 bits×39). The first five bytes (first byte to fifth byte) are header information including information describing a keyword (keyword) and a packet length (length), for example.

The sixth byte to sixteenth byte are Pack-V Information, and the eighteenth byte to thirty first byte are Video mode, both of which store information defined by the specifications.

The thirty second byte to thirty fifth byte are a time code (TTC), and the thirty sixth byte to thirty ninth byte are REC_DATE. The REC_DATE includes information on the date when an image of contents is shot. The time code (TTC) includes information on the time when an image of contents is shot.

More specifically, Data 401 to 424 constructed by the lower four bits of data of eight bits of each of the thirty second to thirty ninth bytes are information on the date or time when an image of contents is shot.

Data 424 (UNIT of YEAR) is information that specifies the year when an image of contents is shot, and Data 423 (UNIT of MONTH) is information that specifies the month when an image of contents is shot. Data 422 (UNIT of DAY) is information that specifies the date when an image of contents is shot. Data 421 (UNIT of TIME ZONE) is an offset time from the UTC (Coordinated Universal Time) defined in a machine by a user and is information on the time zone, which describes the time difference corresponding to the country time (local time) in which the machine is used.

Data 404 (UNIT of HOURS) is information that specifies the "hours" at the time when an image of contents is shot. Data 403 (UNIT of MINUTES) is information that specifies the "minutes" at the time when an image of contents is shot. Data 402 (UNIT of SECONDS) is information that specifies the "seconds" at the time when an image of contents is shot.

Data 401 (UNIT of FRAMES) is information for identifying the time in more detail units than "seconds" at the time when an image of contents is shot and may be the number of a frame to be played. For example, when moving images in one second includes images of 30 frames, the increment of the value (number of frame) described by Data 401 (UNIT of FRAMES) by one means that 1/30 seconds has passed.

In this way, with reference to the time code (TTC) and REC DATE in the AUX-V Video frame included in the contents data in HDV format, the date and time when an image of the contents is shot can be identified. As described above with reference to FIG. 11, one AUX-V Video frame exists for three PES-Vs in contents data in HDV format, and the date and time identified based on the time code (TTC) and REC DATE in each of the AUX-V Video frames are the date and time when an image is shot which corresponds to the image data stored in the first PES-V of the three PES-Vs corresponding to the AUX-V Video frame.

In other words, extracting an AUX-V Video frame included in contents data, identifying the date and time when an image corresponding to image data stored in the first PES-V is shot based on the time code (TTC) and REC DATE and performing the same processing as the processing described with reference to FIGS. 9 and 10 allow extracting a still image from played moving images, identifying the information such as the date and time when the still image is shot, adding the information to the data of the still image and recording them.

Figure 13:
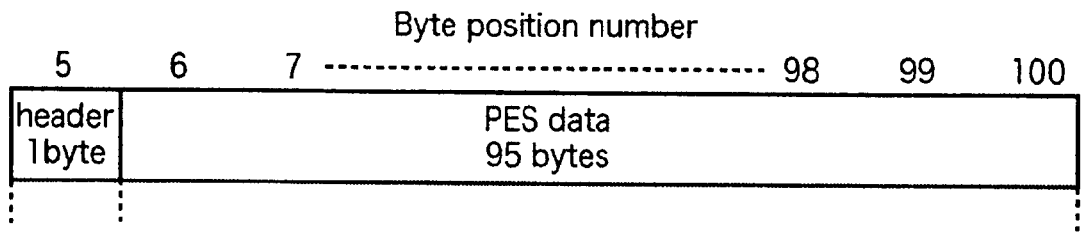
FIG. 13 is a diagram illustrating a construction of PES.

FIG. 13 is a diagram showing a construction example of the PES. In this example, the PES is constructed as data of 95 bytes, and the first one byte (Byte position number: 5) is the header. By analyzing the header of the PES, whether the PES corresponds to one of AUX-A Audio frame, AUX-V Video frame, PES-A and PES-V or not can be determined, and the AUX-V Video frames included in the contents data can be extracted.

Figure 14:
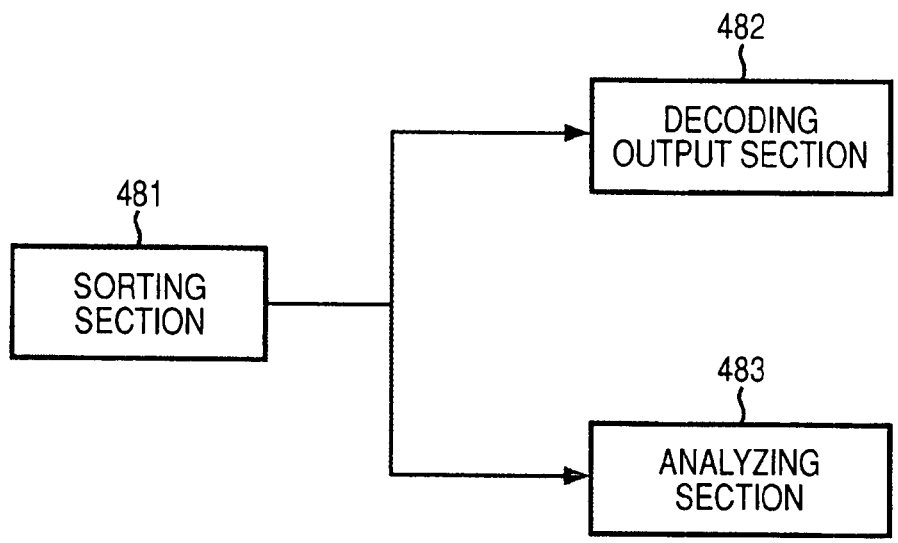
FIG. 14 is a block diagram showing a functional construction example of software to be executed by the microcomputer in FIG. 1.

FIG. 14 is a block diagram showing a functional construction example of software to be executed by the microcomputer 101 in FIG. 1 in order to play contents recorded in HDV format.

In FIG. 14, a sorting section 481 may load the contents data in HDV format, which is recorded in the HDD 152, and analyze the header of the PES, whereby the PES is identified and sorted as one of an AUX-A Audio frame, an AUX-V Video frame, a PES-A and a PES-V.

The sorting section 481 outputs the PES to a decoding output section 482 if the PES is a PES-A or PES-V. The decoding output section 482 controls to supply the PES-A or PES-V to the MPEG decoder 171 through the stream buffer 151.

The sorting section 481 outputs the PES to an analyzing section 483 if the PES is an AUX-A Audio frame or AUX-V Video frame. If an AUX-V Video frame is supplied from the sorting section 481, the analyzing section 483 identifies the date and time when the image corresponding to the image data stored in the first PES-V is shot based on the time code (TTC) and REC DATE of the AUX-V Video frame.

Therefore, based on the information on the date and time when the image corresponding to the image data stored in the first PES-V identified by the analyzing section 483 is shot, the processing is performed, which has been described with reference to FIGS. 9 and 10, to extract a still image from played moving images in the contents in HDV format, identify and add the information on the date and time when the still image is shot to the data of the still image, and record the still image with the information on the date and time.

Having described that the shot time Ty is obtained as the shot time of the I-picture, which is the first picture of a GOP being currently played, with reference to FIGS. 9 and 10, the shot time Ty in this case is obtained by the processing in step S202 as the shot time (including the date) of the image data of the I- or P-picture stored in the first PES-V of a Pack-V.

Furthermore, having described with reference to FIG. 10 that the processing in steps S222 to S224 calculates the elapsed time tc from the playback of the first picture (I-picture) of a GOP after obtaining the frame counter information upon the playback of image data to the display of the current image (or image to be captured) and obtains the shot time D of the (captured) still image to be recorded, the processing in steps S222 and S223 may be omitted in this case.

In other words, by obtaining the shot time of the image data of the I- or P-picture stored in the first PES-V of the Pack-V by the processing in step S202, three PES-Vs (image data) are stored in the Pack-V as described above. Thus, the elapsed time from the image data of the first PES-V of the three PES-Vs to the image data of the third PES-V may be considered as being sufficiently short. Therefore, the shot time of the image data of the first PES-V may be considered as the shot time of the image data of the second or third PES-V, which may be a low possibility of reducing the convenience of a user. As a result, the processing in steps S222 and S223 in FIG. 10 may be omitted.

By the way, having described with reference to FIG. 2 that the date and/or time when a still image extracted from contents data supplied through the terminal 121 is identified based on the shooting starting time of the chapter before recording, an example of how to identify the shooting starting time of a chapter (for example, the time described as the shot time in FIG. 2) will be described below.

As described above, a chapter is located by the microcomputer 101 when the contents data input through the terminal 121 is recorded in the HDD 152 in the recorder/player 100. As described above, each chapter includes contents data corresponding to the period from the time when the image shooting is started by a camcorder, for example, to the time when the shooting ends. Therefore, the image data of the contents in one chapter, for example, is image data continuously shot by a camcorder in serial times from the shooting starting time to the shooting end time.

In other words, the shot times of multiple image data pieces corresponding to the $n^{th}$ chapter are serial shot times. On the other hand, the end time of the shooting of the $n^{th}$ chapter, which is the shot time of the last image data in the $n^{th}$ chapter, and the starting time of the shooting of the $(n+1)^{th}$ chapter, which is the shot time of the first image data in the $(n+1)^{th}$ chapter are discontinuous.

The contents data input through the terminal 121 is data in DV format. The data in DV format includes multiple packs, which will be described later, added to image data (one picture) for one frame. The pack is unit data that stores system data in the data in DV format and data of five bytes.

The data of eight bits of the first one byte (first byte) in the pack, which is data of five bytes is called "PC0". The data of eight bits of the second byte is called "PC1". The data pieces of eight bits of the third to fifth bytes are called "PC2" to "PC4".

The information pieces to be stored in the packs are differentiated by the values of the pack headers stored in "PC0". The pack having the bit stream "01100010" in the pack header is a REC DATE pack. The pack having the bit stream "01100011" in the pack header is a REC TIME pack. The REC DATE pack is a pack storing the information on the date when the image data of the picture having the pack is shot. The REC TIME pack is a pack storing the information on the time when the image data of the picture having the pack is shot.

Figure 15:
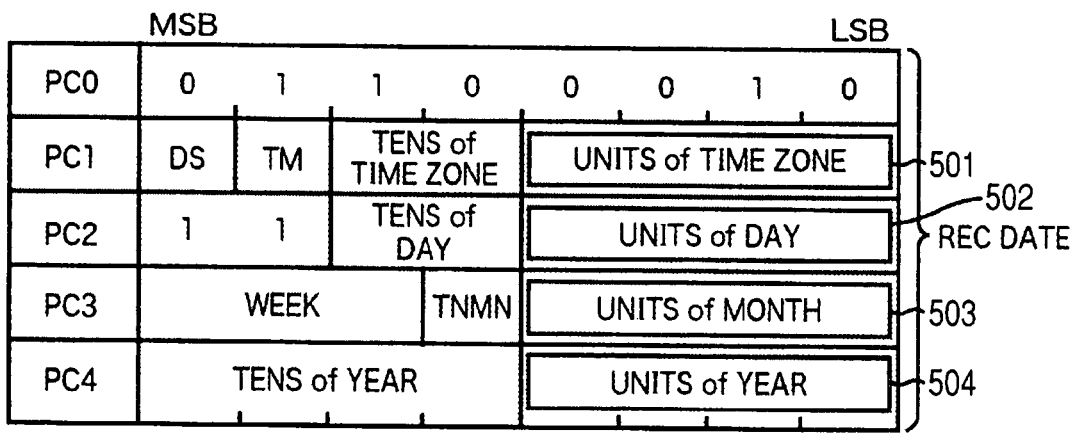
FIG. 15 is a diagram showing constructions of a pack of REC DATE.

FIG. 15 is a diagram showing a construction of the REC DATE pack. As shown in FIG. 15, the bit stream of the pack header ("PC0") is "01100010". "PC1" to "PC4" include the information on the date when the image data is shot.

More specifically, Data 501 to 504 constructed by the lower four bits of data of eight bits of "PC1" to "PC4" are information on the date when the above-described image data (image of the contents) is shot.

Data 504 (UNITS of YEAR) is information that specifies the year when an image of contents is shot, and Data 503 (UNITS of MONTH) is information that specifies the month when an image of contents is shot. Data 502 (UNITS of DAY) is information that specifies the date when an image of contents is shot. Data 501 (UNITS of TIME ZONE) is an offset time from the UTC (Coordinated Universal Time) defined in a machine by a user and is information on the time zone, which describes the time difference corresponding to the country time (local time) in which the machine is used.

Figures 16, 17:
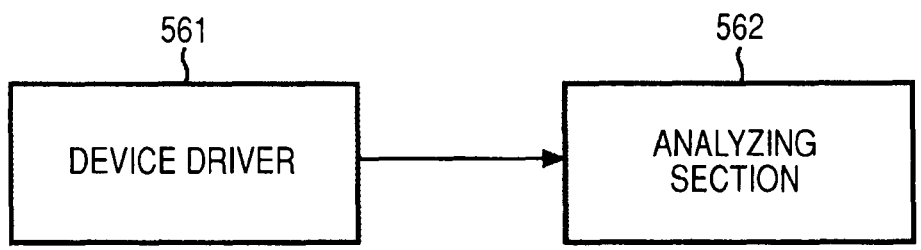
FIG. 16 is a diagram showing constructions of a pack of REC TIME.
FIG. 17 is a block diagram showing another functional construction example of software to be executed by the microcomputer in FIG. 1.
Figure 18:
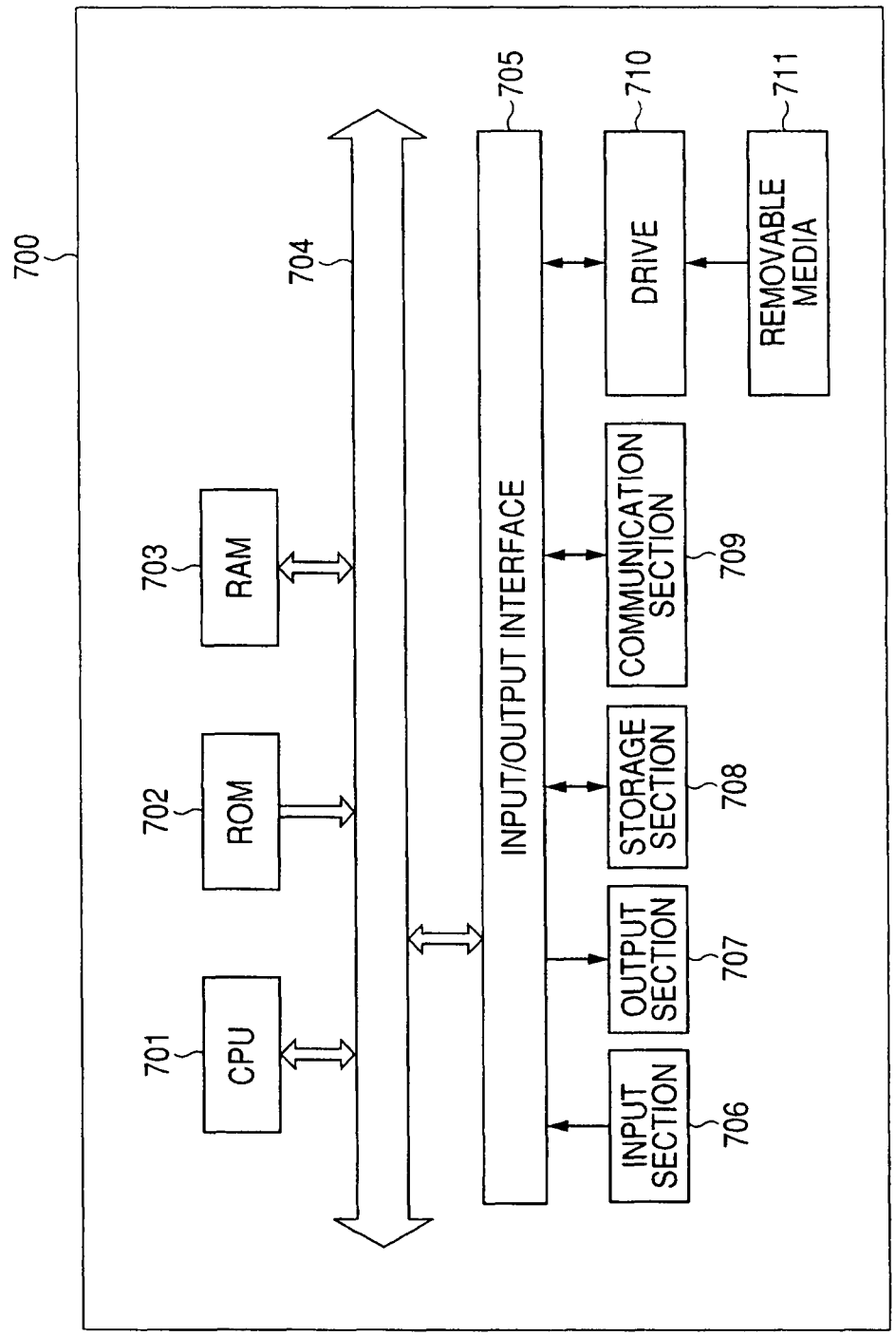
FIG. 18 is a block diagram showing a construction example of a personal computer.

FIG. 16 is a diagram showing a construction of the REC TIME pack. As shown in FIG. 16, the bit stream of the pack header ("PC0") is "01100011". "PC1" to "PC4" include the information on the time when the image data is shot.

More specifically, Data 521 to 524 constructed by the lower four bits of data of eight bits of "PC1" to "PC4" are information on the time when the above-described image data (image of the contents) is shot.

Data 524 (UNITS of HOURS) is information that specifies the "hours" at the time when an image of contents is shot. Data 523 (UNITS of MINUTES) is information that specifies the "minutes" at the time when an image of contents is shot. Data 522 (UNITS of SECONDS) is information that specifies the "seconds" at the time when an image of contents is shot.

Data 521 (UNITS of FRAMES) is information for identifying the time in more detail units than "seconds" at the time when an image of contents is shot and may be the frame number to be played. For example, when moving images in one second includes images of 30 frames, the increment of the value (frame number) described by Data 521 (UNITS of FRAMES) by one means that $1/30$ seconds has passed.

In this way, when contents data input through the terminal 121 is recorded in the HDD 152, the microcomputer 101 can analyze the descriptions in the REC DATE pack and REC TIME pack and obtain the shot time of the image data to be recorded as required.

When the contents data input through the terminal 121 is recorded in the HDD 152, the microcomputer 101 monitors the REC DATE pack and REC TIME pack and detects the image data having discontinuous dates and times. For example, the discontinuity between image data A and image data B is detected if a predetermined period of time or longer has passed between the date and time obtained based on the REC DATE pack and REC TIME pack added to the image data A to be recorded currently and the date and time obtained based on the REC DATE pack and REC TIME pack added to the image data B recorded immediately before.

The microcomputer 101 records with correspondences between discontinuous image data pieces and new chapters. In this case, if the image data A is recorded as image data of Chapter 1, for example, the image data B is recorded as image data of Chapter 2. The microcomputer 101 records the date and time obtained based on the REC DATE pack and REC TIME pack added to the image data B as the time when shooting Chapter 2 is started.

FIG. 17 is a block diagram showing a functional construction example of software to be executed by the microcomputer 101 in FIG. 1 in order to record contents recorded in DV format.

In FIG. 17, a device driver 561 is a device driver controls the DV decoder 122. Every time the DV decoder 122 decodes image (one picture) data for one frame, the device driver 561 outputs a signal indicating that the image data for one frame has been decoded to an analyzing section 562.

If the signal indicating that image data for one frame has been decoded is supplied from the device driver 561, the analyzing section 562 analyzes descriptions in the REC DATE pack and REC TIME pack added to the image data. Then, the analyzing section 562 obtains the date and time when the image data is shot based on the analysis result on the REC DATE pack and REC TIME pack.

The analyzing section 562 checks image data having a discontinuous date and time based on the obtained information on the dates and times. If image data having a discontinuous date and time is detected, the image data with the discontinuity is recorded with a correspondence with a new chapter. Furthermore, the date and time obtained based on the REC DATE pack and REC TIME pack added to the image data are recorded as the time when shooting the new chapter is started. Thus, the shooting starting times of chapters can be identified like the shot time "10:00" of Chapter 0 shown in FIG. 2, the shot time "10:10" of Chapter 1, and the shot time "11:03" of Chapter 2, and the chapters are recorded with the identified shooting starting time.

Thus, the starting time of the chapter corresponding to contents data in DV format can be identified. Therefore, by performing the processing described with reference to FIGS. 9 and 10, a still image can be extracted from played moving images, and the information on the date and time when the still image is shot, for example, can be identified. As a result, the data of the still image with the identified information can be recorded.

Having described the example in which the data of moving images included in contents data recorded in the HDD 152 is encoded by MPEG scheme, the present invention is applicable even to a case that the data of moving images is encoded by other schemes if the information on the shot time of the moving images is recorded as described with reference to FIGS. 2 and 3 or if the information on the shot time of a predetermined picture in moving images is recorded as described above with reference to FIGS. 7 and 8.

Having described the example that a still image is extracted from moving images when the contents data recorded in the HDD 152, for example, is played, the invention is not limited to the case that a still image is extracted from moving images when the contents data recorded in the HDD 152, for example, is played. For example, the invention is applicable even to the case that moving images shot by a camcorder, for example, currently are displayed in realtime and the still image is extracted from the moving images.

The processing in the series of the steps can be performed by hardware and software. When the processing in the series of steps is performed by software, the programs included in the software are installed from a network or a recording medium to a computer built in special hardware or a generic personal computer 700 as shown in FIG. 11, for example, in which functions can be implemented by installing programs.

In FIG. 11, a CPU (Central Processing Unit) 701 performs processing in accordance with a program stored in a ROM (Read Only Memory) 702 or a program loaded from a storage section 708 to a RAM (Random Access Memory) 703. The RAM 703 further stores data necessary for performing processing by the CPU 701 as required.

The CPU 701, ROM 702 and RAM 703 are connected to each other through a bus 704. An input/output interface 705 is further connected to the bus 704.

An input section 706 including a keyboard and a mouse, an output section 707 including a display having a CRT (Cathode Ray Tube) and an LCD (Liquid Crystal Display), for example, and a speaker, a storage section 708 including hard disk, for example, and a communication section 709 including a modem and a network interface card such as a LAN card are connected to the input/output interface 705. The communication section 709 performs communication processing over a network including the Internet.

A drive 710 is connected to the input/output interface 705 as required, and a removable medium 711 such as a magnetic disk, an optical disk, magnetooptical disk and a semiconductor memory is attached therein as required. A computer program loaded therefrom is installed in the storage section 708 as required.

In order to perform the processing in the series of the steps by software, a program including the software is installed from a network such as the Internet or a recording medium such as the removable medium 711.

The recording medium includes not only the one including the removable medium 711 such as a magnetic disk (including a Floppy Disk (Registered Trademark)), an optical disk (including a CD-ROM (Compact Disk-Read Only Memory) and a DVD (including a Digital Versatile Disk)) and a magnetooptical disk (including an MD (Mini-Disk) (Registered Trademark), that records a program and is distributed to deliver the program to a user separately from the apparatus body as shown in FIG. 11 but also one including hard disk included in the ROM 702 or storage section 708 recording a program previously built-in the apparatus body and distributed to a user.

The series of the steps of performing the processing above in this specification include steps of processing to be performed chronologically in the described order and also include processing to be performed in parallel or separately, which are not necessarily performed chronologically.

It should be understood by those skilled in the art that various modifications, combinations, sub-combinations and alterations may occur depending on design requirements and other factors insofar as they are within the scope of the appended claims or the equivalents thereof.

What is claimed is:

1. An image data processing apparatus comprising:
   at least one processor;
   memory storing computer-executable instructions that, when executed by the at least one processor, implement:
   a recording module for recording contents data containing encoded moving image data obtained by encoding moving image data by a first scheme;
   a moving image decoder for loading the contents data recorded in the recording module and decoding the encoded moving image data to provide decoded moving image data; and
   a still image encoder for:
   obtaining a still image from the decoded moving image data, and
   after time information on a time when the still image is shot is generated by a time information generating device based on information added to the encoded moving image data, encoding the still image, along with the generated time information, by a second scheme; and
   the time information generating device for generating the time information on the time when the still image is shot based on the information added to the encoded moving image data,
   wherein:
   the encoded moving image data comprises a chapter,
   the chapter comprises an image from the moving image data corresponding to the still image,
   generating the time information on the time when the still image is shot comprises adding an elapsed time to a time when a first image of the chapter is shot, the elapsed time being from a time when the first image of the chapter is shot until a time when the image from the moving image data corresponding to the still image is shot, and
   the elapsed time is calculated based on counter information created by dividing a play time of the encoded moving image data by a predefined unit time, the counter information being calculated based on a result of the decoding.

2. The image data processing apparatus according to claim 1,
   wherein the moving image data contained in the contents data to be recorded in the recording module is supplied as data in a DV (Digital Video) format and is encoded by the first scheme by the moving image encoder before being recorded.

3. The image data processing apparatus according to claim 1, wherein the encoded moving image data included in the contents data to be recorded in the recording module is moving image data that is encoded by the first scheme in advance and is supplied to the recording module.

4. The image data processing apparatus according to claim 1, wherein:
   the time information is based at least in part on a first time indicating a starting time of recording of at least one first portion of the moving image data and a second time indicating a starting time of displaying of at least one second portion of the decoded moving image data, wherein the at least one second portion corresponds to the still image.

5. The image data processing apparatus according to claim 4, wherein:
   the at least one first portion comprises the chapter; and
   the time information is further based on a value indicating a starting time of displaying of the chapter.

6. The image data processing apparatus according to claim 1, wherein:
   the moving image data comprises a group of images; and
   the time information is based on a time elapsed from a time when a first image of the group of images is shot and a time when an image from the moving image data corresponding to the still image is shot.

7. An image data processing method comprising:
   loading contents data containing encoded moving image data obtained by encoding moving image data by a first scheme, which is recorded in recording means;
   decoding the encoded moving image data to provide decoded moving image data;
   obtaining a still image from the decoded moving image data;
   generating time information on a time when the still image obtained from the decoded moving image data is shot based on information added to the encoded moving image data; and
   encoding the obtained still image by a second scheme along with the generated time information,
   wherein:
   the encoded moving image data comprises a chapter,
   the chapter comprises an image from the moving image data corresponding to the still image,
   generating the time information on the time when the still image is shot comprises adding an elapsed time to a time when a first image of the chapter is shot, the elapsed time being from a time when the first image of the chapter is shot until a time when the image from the moving image data corresponding to the still image is shot, and the elapsed time is calculated based on counter information created by dividing a play time of the encoded moving image data by a predefined unit time, the counter information being calculated based on a result of the decoding.

8. A computer-readable storage device storing computer-executable instructions that, when executed by at least one processor, perform a method comprising:

controlling loading contents data containing encoded moving image data obtained by encoding moving image data by a first scheme, which is recorded in recording means, and decoding the encoded moving image data to provide decoded moving image data;

controlling obtaining a still image from the decoded moving image data;

controlling generating time information on a time when the still image obtained from the decoded moving image data is shot based on information added to the encoded moving image data; and controlling encoding the obtained still image data by a second scheme along with the generated time information, wherein:

the encoded moving image data comprises a chapter, the chapter comprises an image from the moving image data corresponding to the still image, generating the time information on the time when the still image is shot comprises adding an elapsed time to a time when a first image of the chapter is shot, the elapsed time being from a time when the first image of the chapter is shot until a time when the image from the moving image data corresponding to the still image is shot, and the elapsed time is calculated based on counter information created by dividing a play time of the encoded moving image data by a predefined unit time, the counter information being calculated based on a result of the decoding.

9. An image data processing apparatus comprising:

a recording section recording contents data containing encoded moving image data, which is encoded by a first scheme;

a moving image decoding section loading the contents data recorded in the recording section and decoding the encoded moving image data to provide decoded moving image data;

a still image encoding section obtaining a still image from the decoded moving image data and encoding the still image, along with time information on a time when the still image is shot, the encoding being by a second scheme; and a time information generating section generating the time information on the time when the still image obtained from the decoded moving image data is shot based on information added to the encoded moving image data, wherein:

the encoded moving image data comprises a chapter, the chapter comprises an image from the moving image data corresponding to the still image, generating the time information on the time when the still image is shot comprises adding an elapsed time to a time when a first image of the chapter is shot, the elapsed time being from a time when the first image of the chapter is shot until a time when the image from the moving image data corresponding to the still image is shot, and the elapsed time is calculated based on counter information created by dividing a play time of the encoded moving image data by a predefined unit time, the counter information being calculated based on a result of the decoding.

* * * * *